United States Patent [19]

Gunter et al.

[11] Patent Number: 4,782,385

[45] Date of Patent: Nov. 1, 1988

[54] FREQUENCY CONVERSION OF AN RF SIGNAL TRANSMITTED FOR COLOR-TELEVISION RECEIVERS

[75] Inventors: Gerhard Gunter, Neuweiler-Agenbach; Hermannus Schat, Freiburg; Herbert Elmis, Denzlingen; Bernd Novotny, Gundelfingen; Otmar Kappeler, Neuenburg; Dietmar Ehrhardt, Freiburg, all of Fed. Rep. of Germany

[73] Assignee: Deutsche ITT Industries GmbH, Freiburg, Fed. Rep. of Germany

[21] Appl. No.: 899,974

[22] Filed: Aug. 25, 1986

[30] Foreign Application Priority Data

Aug. 27, 1985 [DE] Fed. Rep. of Germany ..... 85110734

[51] Int. Cl.$^4$ ............................................. H04N 9/66
[52] U.S. Cl. ...................................... 358/25; 358/188
[58] Field of Search ....................... 358/25, 21 R, 188; 455/47, 109, 203, 204

[56] References Cited

U.S. PATENT DOCUMENTS 2,716,151 8/1955 Smith ..................................... 358/12
4,642,675 2/1987 Gassmann ......................... 358/21 R

FOREIGN PATENT DOCUMENTS 0122538 10/1984 European Pat. Off. .

OTHER PUBLICATIONS

"Vergrosserung der Ubertragungskapazitat von Kabelfernsehnetzen", pp. 75–78, Dec. 7, 1979, vol. 51, No. 25, by Dr. Pierre Meyrat.

Primary Examiner—John W. Shepperd
Assistant Examiner—David E. Harvey
Attorney, Agent, or Firm—T. L. Peterson

[57] ABSTRACT

The frequency conversion of an RF signal is performed by the "third method" using a suitable frequency reversal which makes the frequencies of the picture carrier, the chrominance subcarrier, and at least one sound carrier appear transformed into the baseband, such that the frequencies of the transformed picture carrier and the transformed chrominance subcarrier coincide. Unavoidable differences in the signal paths of the frequency reversal result in a spurious signal which produces a temporally/locally varying moire on the screen. By means of a frequency offset, this spurious signal is transformed into a frequency range which is not found annoying by the observer, so that the moire becomes invisible. This frequency range is preferably the exact center region between two spectral lines of the horizontal frequency of the composite color signal in the baseband.

10 Claims, 9 Drawing Sheets

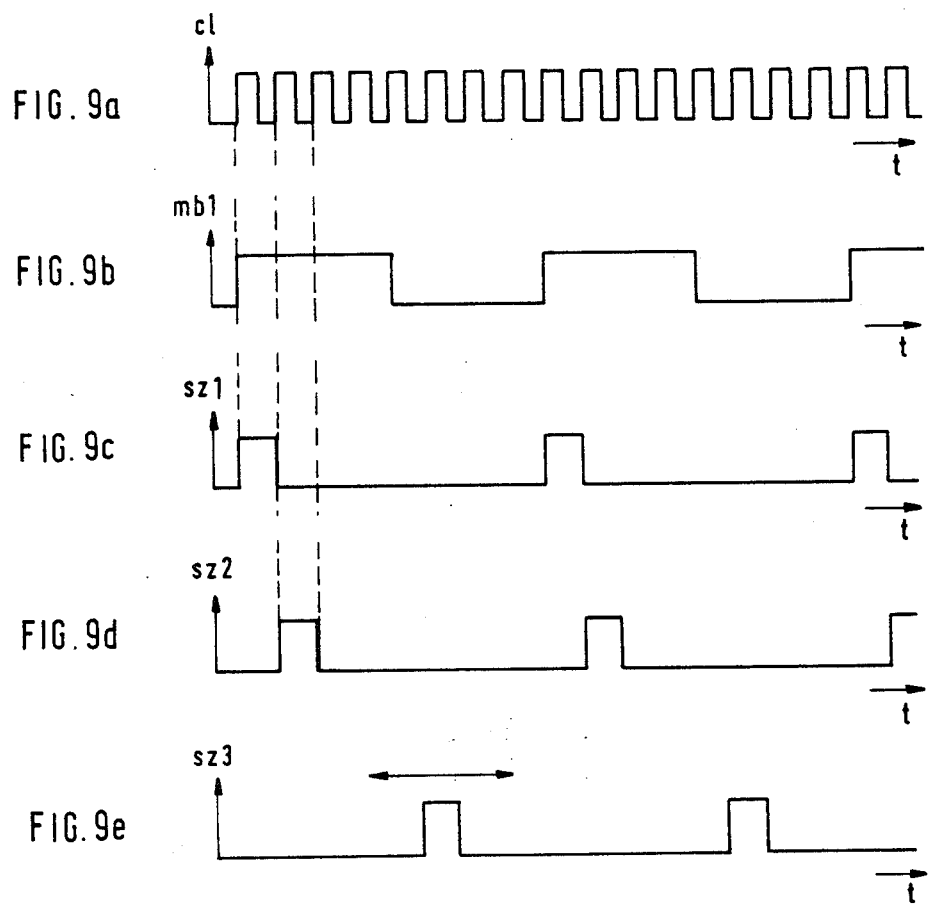

FREQUENCY CONVERSION OF AN RF SIGNAL TRANSMITTED FOR COLOR-TELEVISION RECEIVERS

BACKGROUND OF THE INVENTION

The invention pertains to the frequency conversion of an RF signal transmitted for color-television receivers at the picture-and sound-carrier frequencies by the "third method" using a suitable frequency reversal which makes the frequencies of the picture carrier, the chrominance subcarrier, and at least one sound carrier appear transformed into the baseband. Such a frequency conversion is described in Offenlegungsschrift DE-A-33 13 867; the "third method" is described in a book by H. Meinke and F. W. Gundlach, "Taschenbuch der Hochfrequenztechnik", 2nd Edition, Berlin, 1962, pages 1497 to 1500.

To explain the problem to be solved by the invention, the prior art arrangement will first be described with the aid of FIGS. 1 to 4 in which.

FIG. 1 is a block diagram of an example of a prior art frequency conversion circuit;

FIG. 2 shows schematically the spectrum of the RF signal;

FIG. 3 shows schematically the spectrum of the composite signal transformed into the baseband, with double frequency utilization; and FIG. 4 shows schematically the spectrum of the base signal in the usual baseband position.

The circuit of FIG. 1 corresponds to the circuit shown in Offenlegungsschrift DE-A-33 13 867 for effecting frequency conversion by central reversal.

In the prior art frequency conversion, the frequency of an oscillator ho, i. e. the mixing or conversion frequency fo, is the exact center frequency between the frequency of the received picture carrier bt and that of the received chrominance subcarrier ft'. Therefore, frequency conversion by such radio-frequency mixing is also called "central reversal". Through the radio-frequency mixing, the RF signal hf, starting from the frequency 0 Hz, is so transformed into the baseband that the frequency of the transformed picture carrier bt* and that of the transformed chrominance subcarrier ft* coincide. This frequency is half the frequency of the chrominance subcarrier ft of the composite color signal plus the sound signal, the base signal f. The RF signal hf is applied to the inputs of the first signal mixer s1 and the second signal mixer s2. Each of these signal mixer contains a two-input mixer circuit whose output is fed to a low-pass filter having a passband equal to half the RF signal bandwidth. The output of the low-pass filter is fed to an automatic gain control amplifier. The amplitude-controlled output signals are the output signals m1 and m2 of the first and second signal mixers s1 and s2, respectively.

The tunable oscillator ho generates the conversion signal fo, which is fed to the first signal mixer s1 direct, and to the second signal mixer s2 through the 90-degree phase shifter pad. The output m1 of the first mixer is fed to the first demodulator g1 and the first limiter b1. The output m2 of the second mixer is fed to the second demodulator g2 and the second limiter b2. The output of the first limiter b1 is the first limited mixer signals mb1, and that of the second limiter b2 the second limited mixer signals mb2. Each of the these two signals is applied to one of two inputs of the phase comparator pv. The output of the latter controls the function of the 90-degree phase shifter pd.

The first and second demodulators g1, g2 are synchronous demodulators to which the first demodulating signal d1 and the second demodulating signal d2 are applied as control signals. The demodulating signals come from the burst-signal-processing circuit b, with the second demodulating signal d2 shifted in phase with respect to the first demodulating signal d1 by 90°.

The output of the burst-signal-processing circuit b is fed as a reference signal vb, which has half the chrominance-subcarrier frequency referred to the usual baseband, to one input of the first frequency comparator fv. The other input of the latter is presented with the first limited mixer signal mb1, and the comparator output, the control signal fs, controls the frequency of the oscillator ho.

The outputs of the first demodulator g1 and the second demodulator g2 are applied to the adder ad, whose output is fed to the video low-pass filter vt. The output of the latter is the composite color signal plus the sound signal, the base signal f, in the usual baseband position. The passband of the video low-pass filter vt is equal to the bandwidth of the base signal f.

The base signal f is fed to the input of the burst-signal-processing circuit b, which generates the chrominance subcarrier ft. This circuit contains the chrominance-subcarrier filter, the variable-frequency chrominance-subcarrier oscillator, which oscillates at the frequency of the chrominance subcarrier, and a frequency divider which halves the frequency of the chrominance subcarrier ft; the output of the frequency divider is the reference signal vb and the first demodulating signal d1.

FIG. 2 shows the spectrum of the received RF signal hf, normalized to the frequency of the picture carrier bt. The actual video band with the picture carrier bt extends up to the upper video-band limit 31' at 5 MHz. Shown below the picture-carrier frequency is the limit of the transmitted vestigial sideband 30' at −1.25 MHz. Outside the upper video-band limit 31, the first radio-frequency sound carrier tt1 is a 5.5 MHz, and the second radio-frequency sound carrier tt2' at 5.74 MHz. Within the video band, the color-signal transmission range extends from 5 MHz to 3.25 MHz. The radio-frequency chrominance subcarrier ft' is shown at 4.4. MHz for simplicity. Correspondingly, the signal fo of the oscillator ho is shown at 2.2 MHz.

FIG. 3 shows the composite signal obtained by the mixing processes in the first and second signal mixers s1, s2, which has been transformed into the baseband and shows a double utilization of the frequency range from 0 Hz. The fact that the bandwidth of this transformed composite signal is equal to only half the bandwidth of the RF signal hf can also be seen from the absolute scale, which is shown from 0 MHz to 3 MHz. The left-hand half of the spectrum of FIG. 2, i.e., the half below the frequency of the oscillator signal fo, thus appears reversed about this frequency toward positive values, so to speak. The second scale, given in round brackets, therefore relates to the left-hand portion of the spectrum, and the third scale, given in square brackets, to the original normalization of FIG. 2, i.e., the normalization to the picture carrier bt.

The frequency spectrum shows that the frequency of the transformed picture carrier bt* and that of the transformed chrominance subcarrier ft* coincide at 2.2 MHz. The transformed sound carrier tt1* still lies within the transmitted vestigial sideband, while the transformed sound carrier tt2* is just outside the vestigial sideband.

FIG. 4 shows schematically the spectrum of the base signal f, i.e., the composite color signal plus the sound signal, in the usual baseband. The picture carrier is identical with the frequency 0 Hz. The chrominance subcarrier ft is at 4.4 MHz—the above simplification applies here, too. The upper video-band limit 31 is at 5 MHz. Above this limit are the two sound carriers tt1, tt2.

The reversal of the double frequency utilization by the second frequency reversal at half the chrominance-subcarrier frequency result in the spurious signal ss at 4.4 MHz unless the second reversal is effected so that the addition by means of the adder ad cause total cancellation of the inverse spectrum; in practice, therefore, the spurious frequency ss must always be allows for. As a result of the second reversal, the vestigial sideband, which is still present in FIG. 3, has disappeared.

The aforementioned coincidence of the transformed picture carrier bt* and the transformed chrominance subcarrier ft* is to prevent any moire on the television screen as a result of the difference frequency between the transformed picture carrier bt* and the transformed chrominance subcarrier ft* if the two branches of the receiver with the two radio-frequency mixzers are not absolutely identical. To achieve this aim of absolute agreement between these specific frequencies, the oscillator ho must be locked exactly to the selected conversion frequency fo. However, in the case of television signals, which have carrier frequencies of up to 900 MHz, this is an almost unrealizable requirement because the phase-locked loop must respond so fast that any variations in the frequency of the oscillator ho are immediately compensated for. It is practically impossible to achieve the required synchronization if the oscillator ho produces frequency modulation noise. Even if its frequency deviation is very small, its phase deviation at 900 MHz is greater than 360 degrees. Theoretically, this frequency modulation noise can be counteracted only with extremely broadband control loops. These, however, are highly unstable and, thus, cannot be realized with sufficient reliability.

SUMMARY OF THE INVENTION

Accordingly, the problem to be solved by the invention is to modify and improve the known frequency conversion in such a way that moire on the television screen is eliminated in a different manner which necessitates far less complicated synchronization. In addition, a suitable circuit is to be provided which can be implemented using monolithic integrated circuit techniques and also permits the sound section of the television reciever to be integrated at low cost, and which offers additional qualititive advantages.

One advantage of the invention follows directly from the solution of the problem. Another advantage consists in the fact that, through the direct conversion to the baseband, the composite signal in the baseband can be digitized already during the frequency conversion, so that more precise, signal-path-independent signal processing is achieved. Furthermore, specific filter structures with selectivity curves having steep slopes, which reliably suppress the interfering adjacent sound carriers, particularly in the twin-channel sound system, are easier to implement in digital form. A further adavantage of the invention lies in the fact that, for reversing ("folding") the doubly utilized baseband back into the base signal f, the magnitude and frequency of the latter are exactly obtainable by forming the digital sum of squares followed by digital square-root extration, which together amounts to a digital computation of the geometric mean.

The frequency conversion of the RF signal (hf) is performed by the "third method" using a suitable frequency reversal which makes the frequencies of the picture carrier, the chrominance subcarrier, and at least one sound carrier appear transformed into the baseband, such that the frequencies of the tranformed picture carrier and the transformed chrominance subcarrier coincide. Unavoidable differences in the signal paths of the frequency reversal result in a spurious signal which produces a temperally/locally varying moire on the screen. By means of a frequency offset, this spurious signal is transformed into a frequency range which is not found annoying by the observer, so that the moire becomes invisible. This frequency range is preferably the exact center region between two spectral lines of the horizontal frequency of the composite color signal in the baseband.

BRIEF DESCRIPTION OF THE DRAWING

The invention will be better understood from a reading of the following detailed description in conjunction with the drawing in which:

FIGS. 9a14 9e shows schematically the time relationship between a few signals of the beat comparator of FIG. 8;

DETAILED DESCRIPTION

Figure 1:
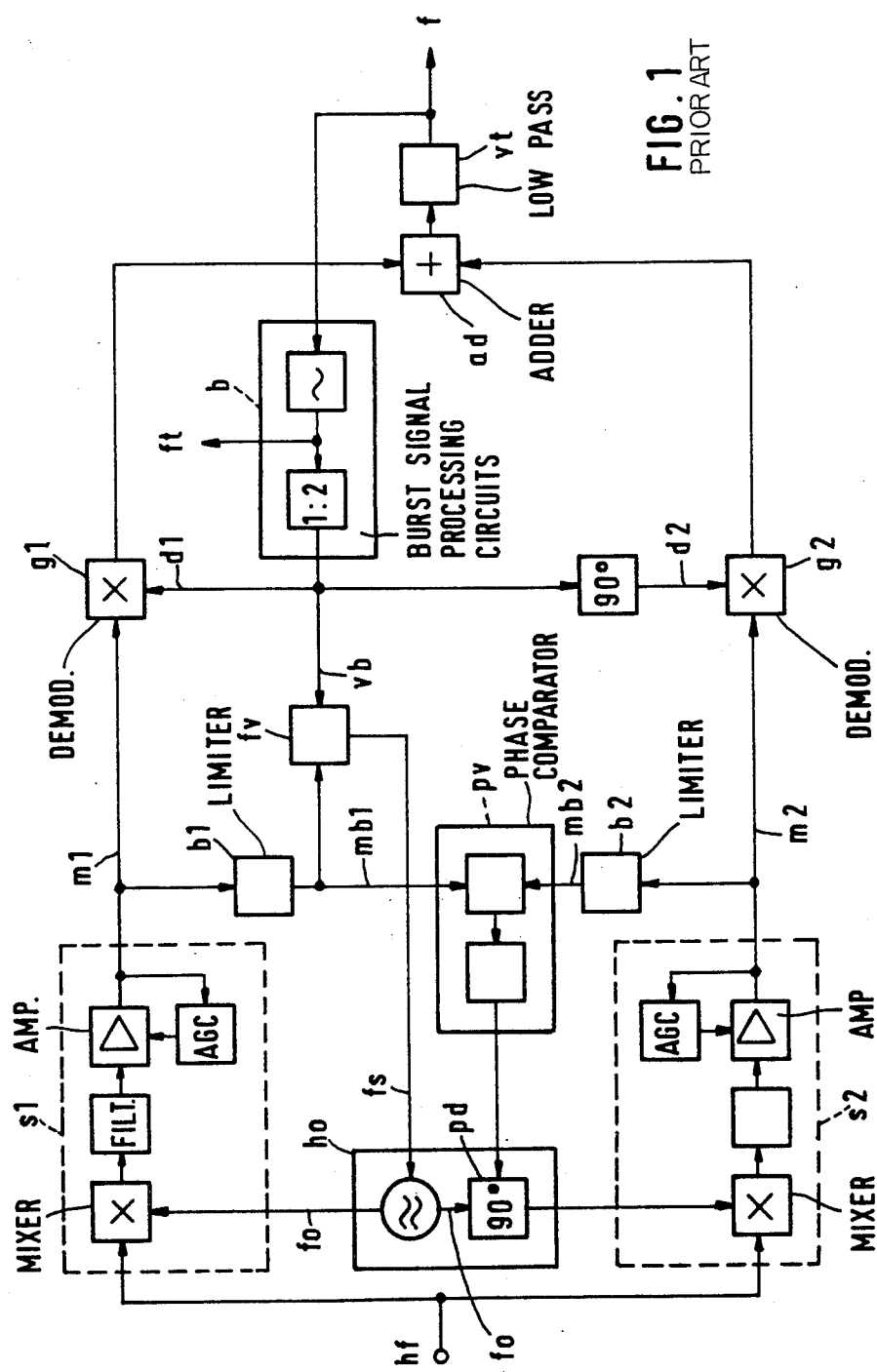
FIG. 1 is a block diagram of an example of a prior art frequency conversion circuit.
Figure 2:
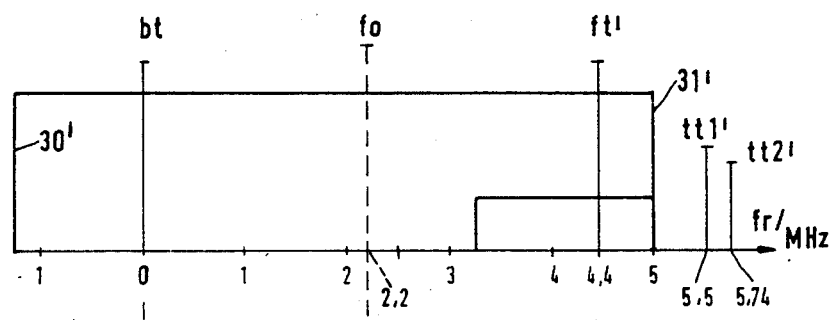
FIG. 2 shows schematically the spectrum of the RF signal.
Figure 3:
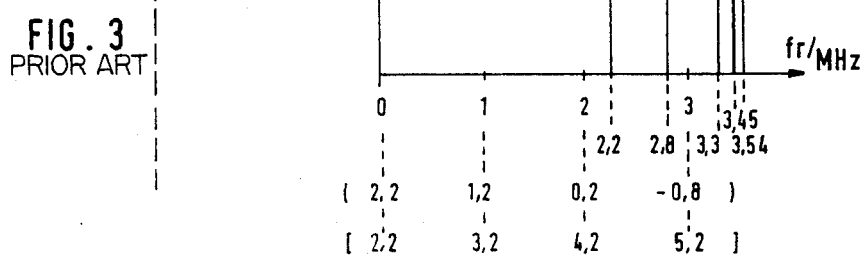
FIG. 3 shows schematically the spectrum of the composite signal transformed into the baseband, with double frequency utilization.
Figure 4:
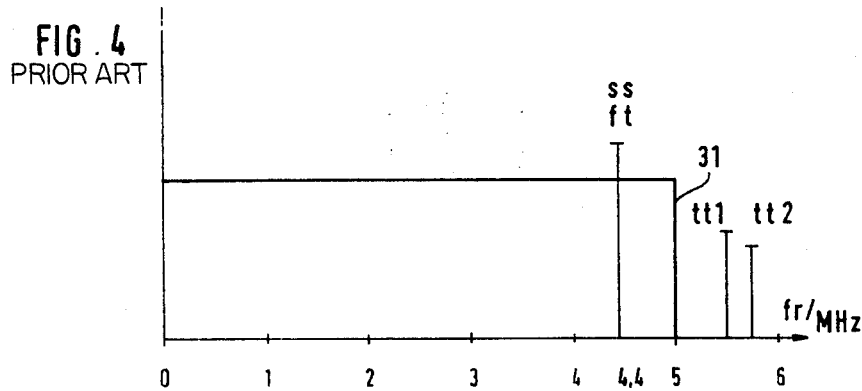
FIG. 4 shows schematically the spectrum of the base signal in the usual baseband position.
Figure 5:
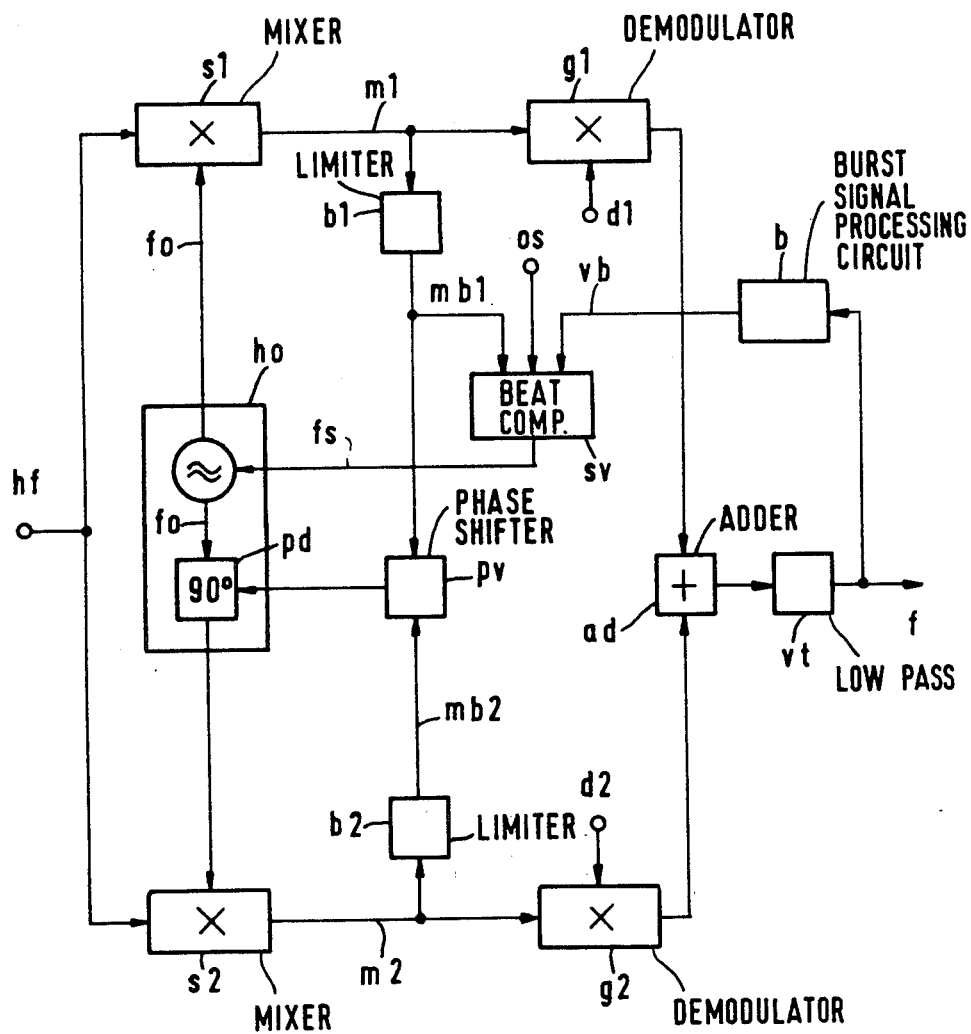
FIG. 5 is a block diagram of an embodiment of a color-television-receiver circuit for carrying out the frequency conversion in accordance with the invention.

The block diagram of FIG. 5 shows an embodiment of a color-television-receiver circuit for carrying out the frequency conversion in accordance with the invention. In the first and second signal mixers s1, s2, the incoming RF signal is converted not with the exact center frequency between the picture carrier bt and the chrominance subcarrier ft', but with a frequency differing therefrom, as will be described in the following.

The RF signal hf is fed to the first signal mixer s1 and the second signal mixer s2, whose second inputs are supplied, respectively, with the first and second output signals of the oscillator ho. The second output signal of the oscillator ho was shifted in phase by 90° with respect to the oscillator signal fo by means of the 90° phase shifter pd.

The output of the first signal mixer s1, the first mixer signal m1, is fed to the inputs of the first demodulator g1 and the first limiter b1. The output of the second signal mixer s2, the second mixer signal m2, is fed to the inputs of the second demodulator g2 and the second limiter b2. The output of the first limiter b1, the first limited mixer signal mb1, and the output of the second limiter b2, the second limited mixer signal mb2, are applied to the two inputs of the phase shifter pv, whose output maintains the phase shift produced by the 90° phase shifter pd exactly at the desired 90° value. The second inputs of the first demodulator g1 and the second demodulator g2 are presented with the first demodulating signal g1 and the second demodulating signal g2, respectively.

The outputs of the first demodulator g1 and the second demodulator g2 are each fed to one of the two inputs of the adder ad, whose output is applied to the video low-pass filter vt. The output of the latter is the base signal f. The passband of the video low-pass filter vt is equal to the bandwidth of the base signal f. The base signal f is fed to the burst-signal-processing circuit b, which produces the reference signal vb, which is fed to one input of the beat comparator sv. The first limited mixer signal mb1 and the offset signal os are applied to further inputs of the beat comparator sv. The output of the latter, the control signal fs, controls the frequency of the oscillator ho.

For the sake of clarity, the following terms are defined:

A phase comparator produces a phase-dependent control voltage by comparing the phases of two applied alternating voltages of the same frequency.

A frequency-dependent control voltage is provided by a frequency discriminator which compares the frequency of an alternating voltage with a fixed frequency.

A detuning-dependent control voltage is provided by a frequency comparator in which the frequencies of two alternating voltages are compared. If, for example, the frequency of one alternating voltage deviates from that of the other in the positive direction, a positive control voltage is delivered; if it deviates in the negative direction, the control voltage is negative.

A beat comparator is a development of the above detuning-dependent frequency comparator; a fixed value and a given direction of the detuning are dnt control voltage is provided by a frequency comparator in which the frequencies of two alternating voltages are compared. If, for example, the frequency of one alternating voltage deviates from that of the other in the positive direction, a positive control voltage is delivered; if it deviates in the negative direction, the control voltage is negative.

A beat comparator is a development of the above detuning-dependent frequency comparator; a fixed value and a given direction of the detuning are desired, and any deviations therefrom are to be corrected.

Such a circuit is the beat comparator sv. The predetermined detuning value is set by the frequency of the offset signal os, which can be derived from the horizontal deflecting signal or the horizontal synchronizing pulses in a simple manner, e.g., by means of frequency dividers.

The determination of the exact frequency of the offset signal os for the frequency shift of the spurious signal ss will now be explained with the aid of FIG. 6, which shows a more finely resolved portion of the spectral distribution of the base signal f for the NTSC color-television standard. The figure shows the region of three spectral lines z of the horizontal frequency fz, about which is centered the respective luminance spectral range lu, represented schematically by means of the amplitude distribution. Exactly in the middle between two spectral lines z of the horizontal frequency fz, the chrominance spectral range cr is centered about the imaginary spectral line of the chrominance subcarrier ft.

As specified by television transmission standards, the luminance spectrum lu consists of spectral lines at intervals of the horizontal frequency, each surrounded by side lines at intervals of the field frequency. If a test pattern is shown with only vertical bands, the side lines disappear. If only horizontal multiples of the field frequency and further harmonics. In that case, only the horizontal synchronizing pulses produce additional spectra at horizontal-frequency intervals.

The spectrum of the chrominance signal behaves in the same manner except that the chrominance spectrum is limited to a bandwidth of about 1 MHz. Thus, the spectrum of an NTSC chrominance signal for any picture consists of spectral lines at intervals of about 15 kHz, each surrounded by side lines at intervals of 60 Hz, like in the luminance signal. The side lines about each of the main spectral lines do not fall off more steeply than in the luminance signal. In the PAL system, however, the "smearing" caused by the averaging of two temporally adjacent lines results in a reduction of the bandwidth of the side lines by a factor of 2, but only after the averaging in the receiver, not during transmission and not in the receiving section of the television receiver.

If the first limited mixer signal mb1 and the reference signal vb have the same frequency, the spurious signal ss caused by the second reversal is located exactly at a frequency which is one-fourth lower than the horizontal frequency fz.

It is known that the visible effects of interference in television signals are at a minimum if the frequency of the interfering signal is located exactly midway between two spectral lines z of the horizontal frequency fz, cf., for example, R. Theile, "Fernsehtechnik", Vol. 1, Berlin 1973, pages 71 to 78.

In accordance with the present invention, the spurious signal ss caused by the second reversal is shifted either toward lower frequencies by one quarter of the horizontal frequency fz, thus becoming a noninterfereing signal ss1 at an offset frequency of $-(\frac{1}{4})$ fz, or toward higher frequencies by three quarters of the horizontal frequency, thus appearing as a signal ss2 at the offset frequency $+(\frac{3}{4})$ fz. The spurious signal may, of course, be additionally shifted in both directions by integral multiples of the horizontal frequency fz, for the subjectively perceived interference minimum is present at these frequency values, too.

Figure 6:
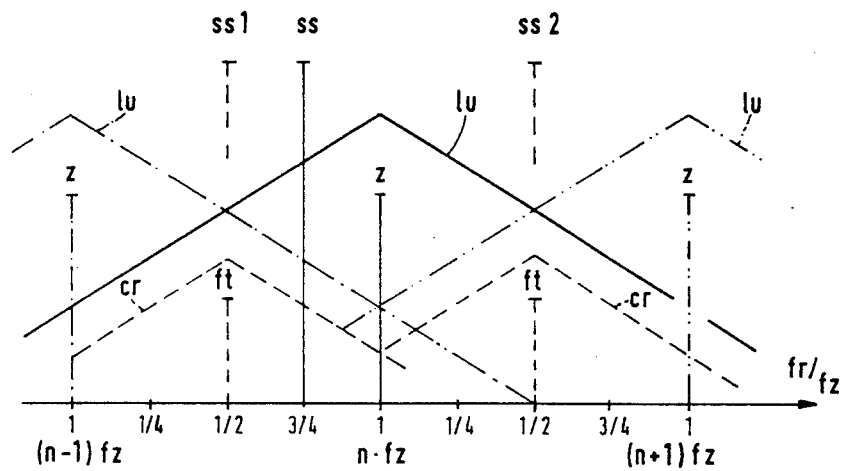
FIG. 6 shows schematically a portion of the signal spectrum after the frequency conversion in the NTSC standard.
Figure 7:
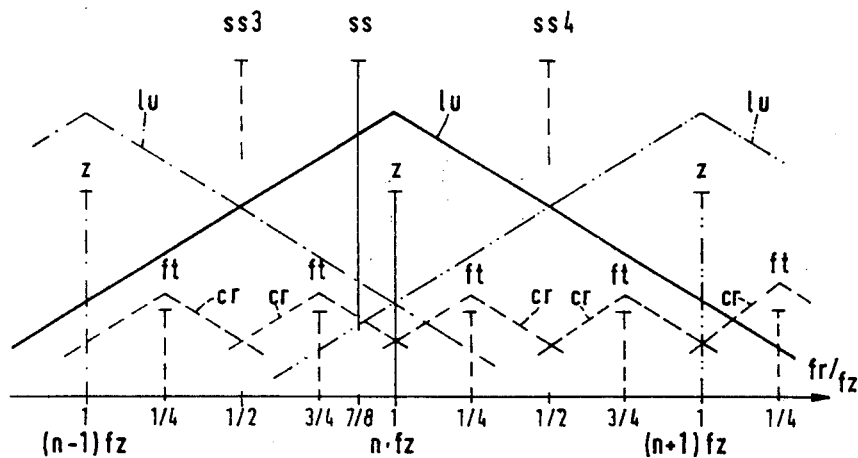
FIG. 7 shows schematically a portion of the signal spectrum after the frequency conversion in the PAL standard.

FIG. 7, a representation similar to that of FIG. 6, shows the spectral fine distribution in the region of three spectral lines z of the horizontal frequency fz for the PAL color-television standard. Unlike in FIG. 6, it can be seen that the chrominance region cr of the spectrum is present twice between every two spectral lines z, namely once in the region of one-fourth of the horizontal frequency and once in the region of three-fourths of the horizontal frequency. The reason for that is the plus/minus−90°-chrominance-subcarrier switching in the PAL color-television standard.

It should be noted that the chrominance region cr is without an actual chrominance subcarrier, as in the NTSC color-television standard. During the picture, the actual chrominance subcarrier is suppressed. As is well known, it is transmitted only as a color burst during a short period of the horizontal retrace signal on the back porch of the composite color signal. In the PAL color-television standard, this actual chrominance subcarrier is located on a spectral line which is one quarter of the horizontal frequency fz below the spectral line z of the horizontal frequency. Therefore, with the exact central reversal, too, the spurious signal ss is located on a spectral line which is one eighth of the horizontal frequency below a spectral line z of the horizontal frequency fz.

From the specified location of the spurious signal ss follows the necessary frequency shift, and thus, the frequency of the offset signal os. The center between two spectral lines z of the horizontal frequency fz can be reached by a frequency shift of $-(\frac{3}{8})$ fz, so that the spurious signal ss3 is located at an offset frequency of $-(\frac{3}{8})$ fz. An increase in the frequency by five eighths of the horizontal frequency results in the spurious signal ss4 at an offset frequency of $+(\frac{5}{8})$ fz. In both cases, the subjective interference minimum is reached for the viewer.

Figure 8:
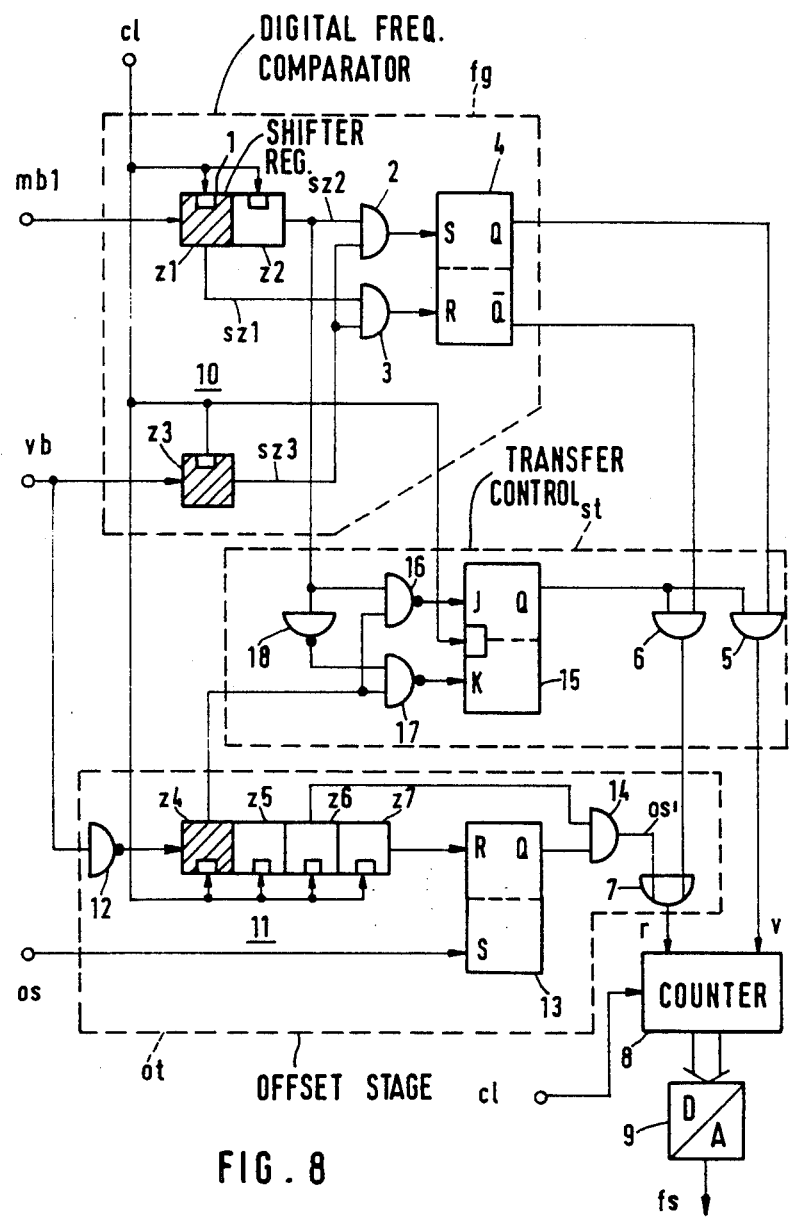
FIG. 8 is a block diagram of an embodiment of the beat comparator of FIG. 5.

FIG. 8 shows an embodiment of a digital beat comparator circuit. The system clock c1 applied to the circuit has four times the chrominance-subcarrier frequency. The functional units contained in the circuit are the digital frequency comparator fg, which determines whether the frequency of the reference signal vb is higher or lower than the frequency of the first limited mixer signal mb1, the transfer control circuit st, which controls the transfer of the result produced by the digital frequency comparator fg into the up/down counter 8, the offset stage ot, which applies additional count pulses to the up/down counter 8 in accordance with the offset signal os, and the digital-to-analog converter 9, which follows the up/down counter 8 and produces the signal fs for controlling the frequency of the oscillator ho.

The first limited mixer signal mb1 is applied to the serial input of the two-stage shift register 1. The input stage of the latter is formed by the first shift-register cell z1, and the output stage by the second shift-register cell z2. The output signal sz2 of the second shift-register cell z2 is applied to one input of the first AND gate 2, to one input of the first NAND gate 16, and to the first inverter 18. The output signal sz1 of the first shift-register cell z1 is applied to one input of the second AND gate 3. The other input of the first AND gate 2 is connected to the other input of the second AND gate 3, and both inputs are connected jointly to the output of the one-stage second shift register 10, which is formed only by the third shift-register cell z3. The latter is supplied at its input with the reference signal vb and delivers the output signal sz3.

The outputs of the first AND gate 2 and the second AND gate 3 are coupled, respectively, to the S input and the R input of the first RS flip-flop 4. The Q and Q̄ outputs of the latter are fed to one input of the third AND gate 6 and to one input of the fourth AND gate 5, respectively. The two other inputs of these two AND gates are connected together and to the Q output of the JK flip-flop 15. The output of the first inverter 18 is fed to the first input of the second NAND gate 17, whose second input is connected to the second input of the first NAND gate 16.

The output of the latter and that of the second NAND gate 17 are connected, respectively, to the J input and the K input of the JK flip-flop 15.

The reference signal vb is applied through the second inverter 12 to the serial input of the four-stage third shift register 11, whose input stage, the fourth shift-register cell z4, is followed by the fifth, sixth, and seventh shift-register cells z5, z6, z7.

The output of the fourth shift-register cell 4z is fed to the second inputs of the second NAND gate 17 and the first NAND gate 16.

The offset signal os is applied to the S input of the second RS flip-flop 13, whose R input is presented with the output signal of the seventh shift-register cell z7. The Q output of the second RS flip-flop is connected to one input of the fifth AND gate 14, whose other input is connected to the output of the sixth shift-register cell z6.

The output fo the third AND gate 6 and that of the fifth AND gate 14 are each connected to one of the two inputs of the OR gate 7, whose output serves as the count-down signal r for the up/down counter8. The up enable signal v for the up/down counter 8 is the output signal fo the fourth AND gate 5, and the count-up signal the system clock c1. The count outputs of the up/down counter 8 are fed to the digital-to-analog converter 9, whose output is the analog control signal fs for controlling the frequency of the oscillator ho.

The output of the fifth AND gate 14 is the signal os', which is derived from the offset signal os. This signal is combined with the output signal of the AND gate 6 or by the OR gate 7, whereby it is slightly changed in such a way that the oscillator ho changes the frequency of its output signal by frequency equal to that of the offset signal os.

The system clock c1 is applied to the first, second, and third shift registers 1, 10, 11 and to the clock input of the JK flip-flop 15. The other subcircuits of FIG. 8 are not clocked; they may, of course, be replaced by clocked subcircuits, which must then be clocked by the system clock c1, too.

FIGS. 9a–e shows the waveform of a few characteristic signals of the embodiment of the beat comparator sv of FIG. 8.

The waveform shown in FIG. 9a is that of the system clock c1.

FIG. 9b shows the waveform of the first limited mixer signal mb1. The limiting action given an 1:1 mark-to-space ratio at a frequency equal to one eighth of the system-clock frequency; this follows from the central reversal.

FIG. 9c shows the output signal sz1 of the first shift-register cell z1. The leading edge of this signal coincides with leading edge of the first limited mixer signal mb1, but the signal remains in the high state for only one period of the system clock c1.

FIG. 9d shows the output signal sz2 of the second shift-register cell z2. It is delayed by one clock period with respect to the signal of FIG. 9c. These two signals correspond to a successively opening signal window which makes it possible to determine whether a frequency to be compared is higher or lower than the frequency of the first limited mixer signal mb1. An evaluation logic must then determine in which time window the frequency to be compared appears first; then it is possible to decide whether this frequency is higher or lower than the frequency of the first limited mixer signal mb1. This is done in the digital frequency comparator fg (FIG. 8).

The signal to be compared in frequency with the first limited mixer signal mb1, namely the reference signal vb, is shown schematically in FIG. 9e in the form of the output signal sz3 of the third shift-register cell z3. The shift-register cell z3 converts the reference signal vb into a signal which remains in the high state for only one clock period in each cycle. With this signal, the time-window comparison is performed.

In the arrangement of FIG. 8, the subcircuits 1, 2, 3, 4, 10 form the frequency comparator fg in the strict sense. Their operation is apparent from FIGS. 9a–e.

At the turn-on instant, the pulses of the reference signal vb and those of the first limited mixer signal mb1 move opposite to each other at an unknown difference frequency which, however, will not generally differ by more than +/−200 kHz from the nominal frequency as the tuner is crystal-stabilized. If the pulses of the output signal sz3, i.e., the pulses in FIG. 9e, move from left to right in relation to the pulses of FIG. 9c and 9d, they will coidcide first with the pulses of FIG. 9c and then with the pulses of FIG. 9d. As a result, first the AND gate 1 and then the AND gate 3 are enabled, and the RS flip-flop 4 is thus set and reset in this order. On a time average, the RS flip-flop 4 is thus in the state determined by the AND gate 3.

If, however, the output signal sz3 moves in the opposite direction relative to the signal mb1, the RS flip-flop 4 will, on a time average, be in the state determined by the AND gate 2. The flip-flop outputs thus provide signals which, if smoothed with an RC section, correspond to the real detuning-dependent control voltage of an analog phase and frequency comparator for achieving a zero difference frequency.

All other parts of the arrangement of FIG. 8 serve to tune the arrangement to a difference frequency equal to half the horizontal frequency. The gates 5 and 6 are controlled by the JK flip-flop 15, which provides difference-frequency pulses differing in phase from the output pulses of the AND gate 2 by 180°. Thus, the AND gate 5 and 6 are not enabled until the RS flip-flop 4 is in the off state. The JK flip-flop 15 receives its pulses from the shift register via the gate 16, 17, 18. Because of the inverter 12, the output pulses of the shift-register cells z3 and z4 differ in phase by 180°.

The subcircuits 15, 16, 17, and 18 ensure that the Q output of the JK flip flop 15 is at the H level if the output pulses of the shift-register cells z2 and z4 coincide, and at the L level if they do not coincide. This ensures that the AND gates 5 and 6 are enabled only once per difference-frequency cycle, not several times, so that the counter 8 is increased by only one count. The counter 8 performs the function of an integrater, for the control voltage fs appearing at the output of the digital-to-analog converter 9 gradually approaches its desired value. However, this integrator operates so that the rate of change of the control voltage decreases as the difference frequency decreases as a result of the fine tuning. The desired value of the frequency (zero differnece frequency) is thus reached asymptotically.

Figure 10:
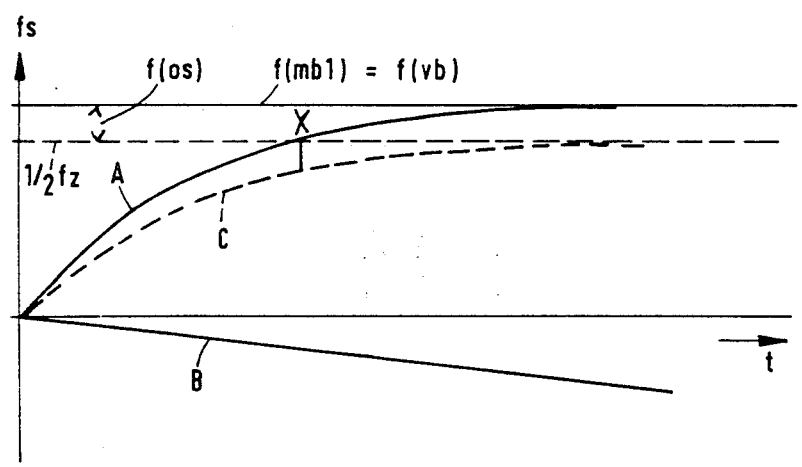
FIG. 10 shows different curves serving to explain FIG. 8.

Such time behavior is shown in FIG. 10 as curve A. The instantaneous slope dU/dt is a measure of the instantaneous deviation from the zero difference frequency. If an oppositely directed slop (curve B) corresponding to a deviation by half the horizontal frequency could be superimposed on this slope, the slope would be zero, i.e., the control voltage would have reached its final state at a deviation by half the horizontal frequency (curve C), which corresponds to the point X. This is achieved by additionally applying to the counter 8 pulses at half the horizontal frequency which cause the counter to count down irrespective of the other count pulses. These pulses must not interfere with the counting process caused by the other pulses.

In FIG. 8, this is achieved by applying the count-down pulses of half the horizontal frequency through the OR gate 7 at times when no other pulses can arrive. The offset signal os, used as these pulses of half the horizontal frequency, set the RS flip-flop 13. The shift-register cell z6 delivers pulses at times which do not coincide with the times of the pulses from the cell z3, i.e., at time when the counter 8 definitely is not driven by other pulses. When the RS flip-flop 13 has been set by the offset signal os, the OR gate 7 is supplied with a pulse from the AND gate 14. Shortly thereafter, the RS flip-flop 13 is reset by a pulse from the cell z7, so that only short pulses are applied to the OR gate 7 in the rhythm of the offset signal os.

Thus, the control voltage provided by the digital-to-analog converter 9 adjusts itself so that the desired condition, namely frequency deviation by half the horizontal frequency, is accurately met. An essential advantage of this circuit concept is that this requires no alignment whatsoever. Other circuits that have been given consideration would have had the disadvantage of requiring additional digital filters.

Figure 11:
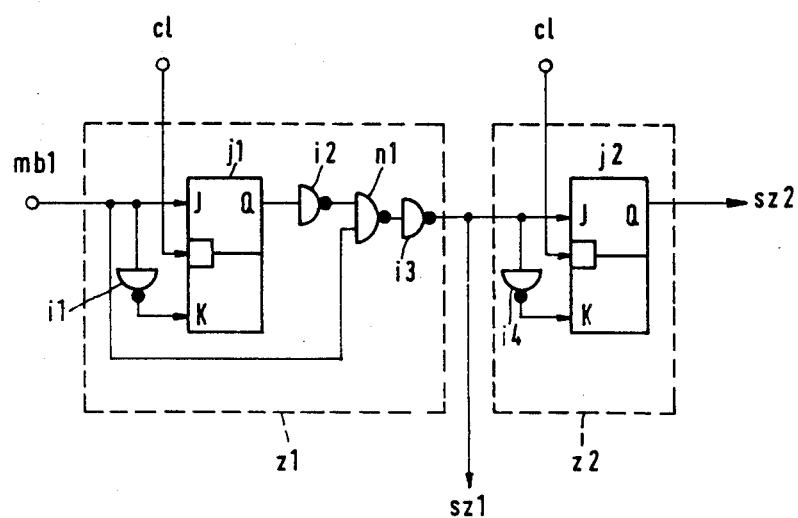
FIG. 11 is a block diagram of the beat comparator of FIG. 8.

FIG. 11 shows an embodiment of the first shift register 1. The design of the first shift-register cell z1 is identical with that of the third and fourth shift-register cell z3 and z4. All other shift-register cells can be of the same design as the second shift-register cell z2.

The first limited mixer signal mb1 is applied to the J input of the JK flip-flop j1. The K input is supplied with the same signal through the inverter i1. The Q output of the JK flip-flop j1 is fed through the inverter i2 to the input of the NAND gate n1, whose second input is presented with the first limited mixer signal mb1, and whose output passes through the inverter i3 to the output of the first shift-register cell z1 and is fed to the input of the second shift-register cell z2.

The output signal sz1 is applied directly to the J input of the JK flip-flop j2 and through the inverter i4 to the K input. The Q output of the JK flip-flop j2 is the output of the second shift-register cell z2, which delivers the signal sz2. The clock inputs of the two JK flip-flops j1 and j2 are supplied with the system clock c1.

Figure 12:
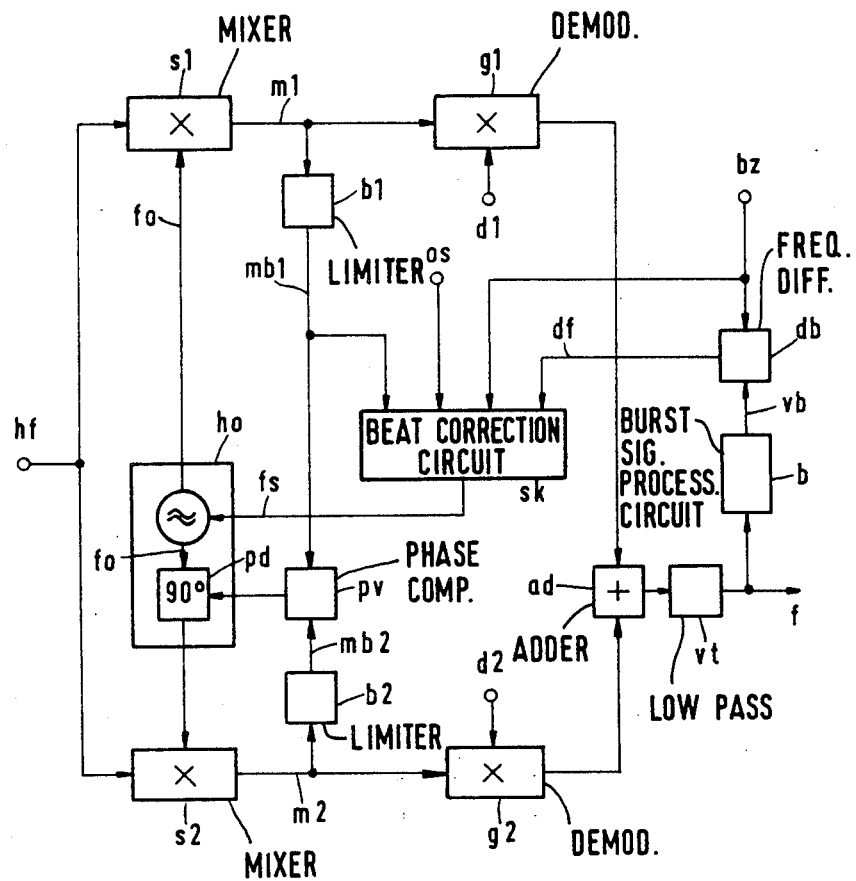
FIG. 12 is a block diagram of a further embodiment of a color-television-receiver circuit for carrying out the frequency conversion in accordance with the invention.

FIG. 12 shows a further embodiment of the color-television receiver circuit for carrying out the frequency conversion in accordance with the invention. This circuit is identical with the circuit of FIG. 5 with the exception of the following differences. The beat comparator sv has been replaced by the beat correction circuit sk, to which the first limited mixer signal mb1, the offset signal os, the reference signal bz, and the frequency-difference signal df are applied; the two latter signals will be explained later.

The reference signal bz has a frequency similar to that of the reference signal vb, but instead of being locking in frequency and phase to the color burst, it is locked to a different frequency of the television standard. This may be, for example, the horizontal frequency or a multiple thereof which is used as a system clock synchronized with the picture.

The frequency-difference signal df is formed by applying the reference signal bz and the reference signal vb to the two inputs of the frequency-difference stage db, so that the frequency-difference signal df is obtained.

The operation of the beat correction circuit sk is as follows. Without the action of the frequency-difference signal df, the circuit of FIG. 12 would operate nearly in the same manner as the beat comparator sv of FIG. 5 except that the beat comparison would be based on the reference signal bz, which differs from the frequency of the reference signal vb. The detuning-dependent nominal beat frequency between the first limited mixer signal mb1 and the reference signal bz would differ by the same amount. Thus, the spurious signal ss would not be located exactly midway between two spectral lines z of the horizontal frequency.

The signal for correcting the frequency value is fed to the beat correction circuit sk as the frequency-difference signal df. The frequency of the offset signal os is thus increased or decreased by the frequency of the frequency-difference signal df according to the sign of the frequency to be corrected.

Figure 13:
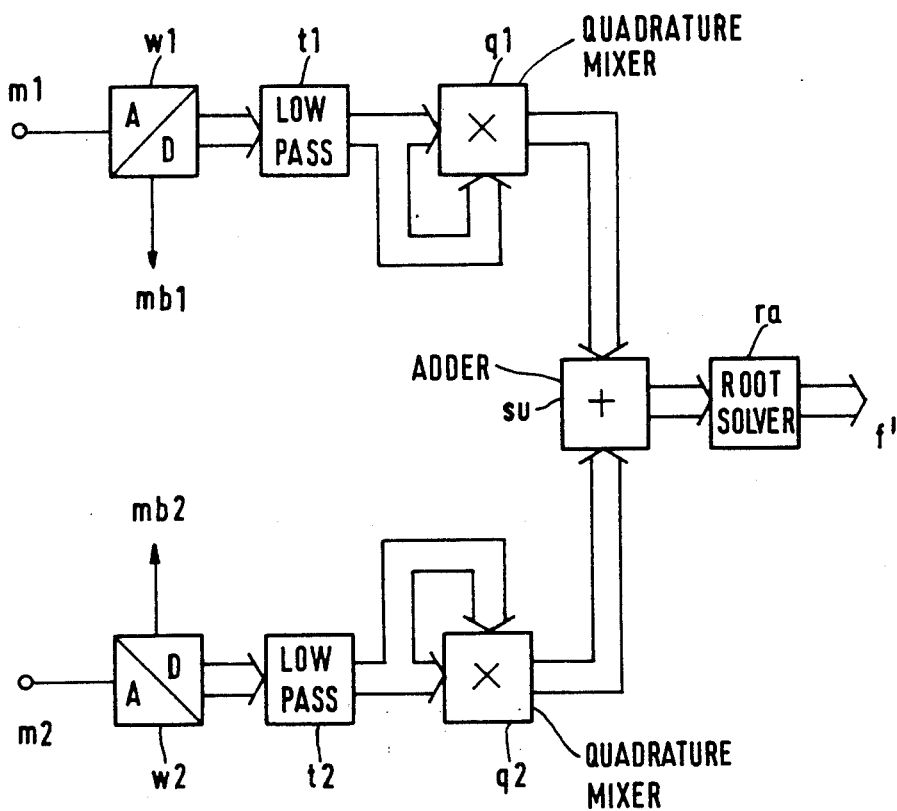
FIG. 13 is a block diagram of an embodiment of a circuit for deriving the digital base signal by forming the absolute value of the first and second mixer signals.

FIG. 13 shows how the first and second mixer signals m1 and m2 can be further processed in digitized form in a further embodiment of the color-television receiver circuit.

The first and second mixer signal m1 and m2 are fed, respectively, to the first and second analog-to-digital converters w1 and w2, whose outputs are fed to the first and second digital low-pass filters t1 and t2. The ouput signal of the low-pass filter t1 is applied to the two inputs of the first digital quadrature mixture q1, and that of the second low-pass filter t2 to the two inputs of the second digital quadrature mixer q2. The passbands of the first and second digital low-pass filters t1 and t2 are equal to half the bandwidth of the base signal f.

The most significant bit or a combination of most significant bits of the output signals of the first and second analog-to-digital converters w1 and w2 form the first and second limited signals mb1 and mb2, respectively.

The output of each of the two digital quardrature mixers q1 and q2 is fed to one of the two inputs of the digital adder su, whose output is fed to the digital root solver ra. The output of the latter is the degitized base signal f'.

In a modification of the circuit arrangement of FIG. 5, the beat comparator sv contains a signal-sideband mixer as an offset mixer whose two inputs are supplied with the first limited mixer signal mb1 or the reference signal vb and the offset signal os, respectively. The offset mixer is preferably a circuit which adds the pulse train at its second input to the pulse train at its first input or subtracts it from that at the first input.

What is claimed is:

1. A frequency conversion circuit for operating on an RF signal transmitted for color-television receivers at the picture and sound carrier frequencies using a frequency reversal to make the frequencies of the picture carrier, the chrominance subcarrier and at least one sound carrier appear transformed into the baseband, said circuit comprising:

a tunable oscillator including a phase shifter and providing a first ouput signal and a second output signal separated in phase by 90 degrees and both having a frequency within the spectrum of said RF signal;

a first signal-mixer receiving said RF signal and said first output signal to provide a first mixer signal;

a second signal mixer receiving said RF signal and said second output signal to provide a second mixer signal;

a first demodulator receiving said first mixer signal and a first demodulating signal, and having an output;

a second demodulator receiving said second mixer signal and a second demodulating signal and having an output;

an arithmetic circuit for receiving and arithmetically combining said first and second demodulator outputs and to provide an output;

an output terminal;

a video low pass filter coupled between said arithmetic circuit output and said output terminal to provide as an output a base signal including a composite color signal plus a sound signal, said filter having a passband equal to the bandwidth of said base signal;

a first limiter having an input receiving said first mixer signal and having an input;

a second limiter having an input receiving said second mixer signal and having an output;

a burst signal processing circuit having an input coupled to said output terminal and having an output providing a first reference signal at half the chrominance subcarrier frequency; and a beat comparator having a first input coupled to said first limiter output, a second input coupled to said burst-signal processing circuit output, and a third input receiving an offset signal, said beat comparator comparing the beat frequency between said first reference signal and said first mixer output to the frequency of said offset signal and said beat comparator having a control output coupled to said oscillator and controlling the frequency of said oscillator first and second output signals by a signal frequency shift such that said beat frequency is equal to the frequency of said offset signal.

2. A frequency conversion circuit in accordance with claim 1 wherein:

said RF signal is transmitted in accordance with an NTSC color television standard; and the frequency of said offset signal is either $-(\frac{1}{4}+n)fz$ or $+(\frac{3}{4}+n)fz$;

where $n=0, 1, 2 \ldots$, fz is the horizontal frequency, and the negative and positive signs indicate, respectively, a decrease and an increase in the frequency of said oscillator first and second output signals.

3. A frequency conversion circuit in accordance and claim 1 wherein:

said RF signal is transmitted in accordance with an PAL color television standard; and the frequency of said offset signal is either $-(\frac{3}{8}+n)fz$ or $+(\frac{5}{8}+n)fz$;

where $n=0, 1, 2 \ldots$, fz is the horizontal frequency, and the negative and positive signs indicate, respectively, a decrease and an increase in the frequency of said oscillator first and second output signals.

4. A frequency conversion circuit in accordance with claim 1, wherein:

said beat comparator includes a frequency comparator to which said first mixer signal and said first reference signal are applied and having an output signal which is, combined with a signal derived from said offset signal such that said beat comparator control output applied to said oscillator changes the frequency of said oscillator first and second output signals by an amount corresponding to the frequency of said offset signal.

5. A frequency conversion circuit in accordance with claim 4 wherein:
said beat comparator comprises a digital circuit clocked by a system clock whose phase is locked to the phase of a portion of the composite color signal contained in said base signal, the frequency of said system clock being an integral multiple of the frequency of said portion of the composite color signal;
said frequency comparator is a digital frequency comparator;
said beat comparator further including;
an up/down counter receiving said system clock as a count-up signal;
a transfer control circuit which couples the output state of said digital frequency comparator to said up/down counter as an up enable signal or a count down signal,
an offset stage controlled by said offset signal for delivery of additional count down signals to said up/down counter, and
a digital-to-analog converter for converting the count of said up/down counter into said beat comparator control output.

6. A frequency conversion circuit for operating on an RF signal transmitted for color-television receivers at the picture and sound carrier frequencies using a frequency reversal to make the frequencies of the picture carrier, the chrominance subcarrier and at least one sound carrier appear transformed into the baseband, said circuit comprising:
a tunable oscillator including a phase shifter and providing a first output signal and a second output signal separated in phase by 90 degrees and both having a frequency within the spectrum of such RF signal;
a first signal-mixer receiving said RF signal and said first output signal to provide a first mixer signal;
a second signal mizer receiving said RF signal and said second output signal to provide a second mixer signal;
a first demodulator receiving said first mixer signal and a first demodulating signal, and having an output;
a second demodulator receiving said second mixer signal and a second demodulating signal, and having an output;
an arithmetic circuit for receiving and arithmetically combining said first and second demodulator outputs and to provide an output;
an output terminal;
a video low pass filter coupled between said arithmetic circuit output and said output terminal to provide as an output a base signal including a composite color signal plus a sound signal, said base signal having a conventional baseband portion, said filter having a passband equal to the bandwidth of said base signal;
a first limiter having an input receiving said first mixer signal and having an output;
a second limiter having an input receiving said second mixer signal and having an output;
a burst signal processing circuit having an input coupled to said output terminal and having an output providing a first reference signal at half the chrominance subcarrier frequency;
a frequency difference circuit having one input coupled to said output of said burst signal processing circuit and a second input for receiving a second reference signal which is locked in frequency and phase to the horizontal frequency for providing at an output a frequency difference signal which is the frequency difference between said first and second reference signals;
a beat correction circuit having a control output coupled to said oscillator for controlling the frequency thereof and having a first input coupled to said first limiter output, a second input receiving an offset signal, a third input coupled to the output of said frequency difference circuit and a fourth input for receiving said second reference signal, and which provides a signal frequency shift at said control output for controlling the frequency of said oscillator.

7. A frequecny conversion circuit for operating on an RF signal transmitted for color-television receivers at the picture and sound carrier frequencies using a frequency reversal to make the frequencies of the picture carrier, the chrominance subcarrier and at least one sound carrier appear transformed into the baseband, said circuit comprising:
a tunable oscillator including a phase shifter and providing a first oscillator signal and a second oscillator signal separated in phase by 90 degrees and both having a frequency within the spectrum of said RF signal;
a first signal mixer receiving said RF signal and said first oscillator signal to provide a first mixer signal;
a second signal mixer receiving said RF signal and said second oscillator signal to provide a second mixer signal;
first and second analog to digital converters for digitizing said first and second mixer signals, respectively;
first and second digital low pass filters having inputs connected to said first and second analog to digital converters, respectively, and each having a passband equal to one half the bandwidth of a digitized base signal;
a first digital quadrature mixer having two inputs both coupled to the output of said first digital low pass filter;
a second digital quadrature mixer having two inputs both coupled to the output of said second digital low pass filter;
a digital arithmetic circuit for arithmetically combining the outputs of said first and second mixers;
a root solver having inputs coupled to the output of said digital arithmetic circuit, the output of said root solver taking the form of said digitized base signal; and
means responsive to at least a portion of the outputs of said first and second analog to digital converters for adjusting the frequency of said oscillator.

8. A method for the frequency conversion of an RF signal transmitted for a color television receiver at the picture and sound carrier frequencies using a frequency reversal circuit to make the frequencies of the picture carrier, the chrominance subcarrier and at least one sound carrier appear transformed into the baseband, which transformation undesirably causes spurious signals due to unavoidable signal path differences in said frequency reversal circuit to appear as an undesirable moire pattern on the television screen, said method including the step of using a frequency offset between the transformed picture carrier frequency and the transformed chrominance subcarrier frequency to shift said spurious signals frequencies resulting from said unavoidable signal-path differences which produce the moire pattern on the television screen to be placed into a frequency range causing said moire pattern to be minimized from the standpoint of a viewer.

9. A method in accordance with claim 9 wherein:
the frequency value for said frequency offset is $-(\frac{1}{4}+n)$ fz or $-(\frac{3}{4}+n)$ fz for the NTSC color-television standard and n=0, 1, 2 ..., fz is horizontal frequency.

10. A method in accordance with claim 9 wherein:
the frequency value for said frequency offset is $-(\frac{3}{8}+n)$ fz or $+(\frac{5}{8}+n)$ fz for the PAl color-television standard and n=0, 1, 2 ..., fz is the horizontal frequency.

* * * * *